Figures 1, 2:
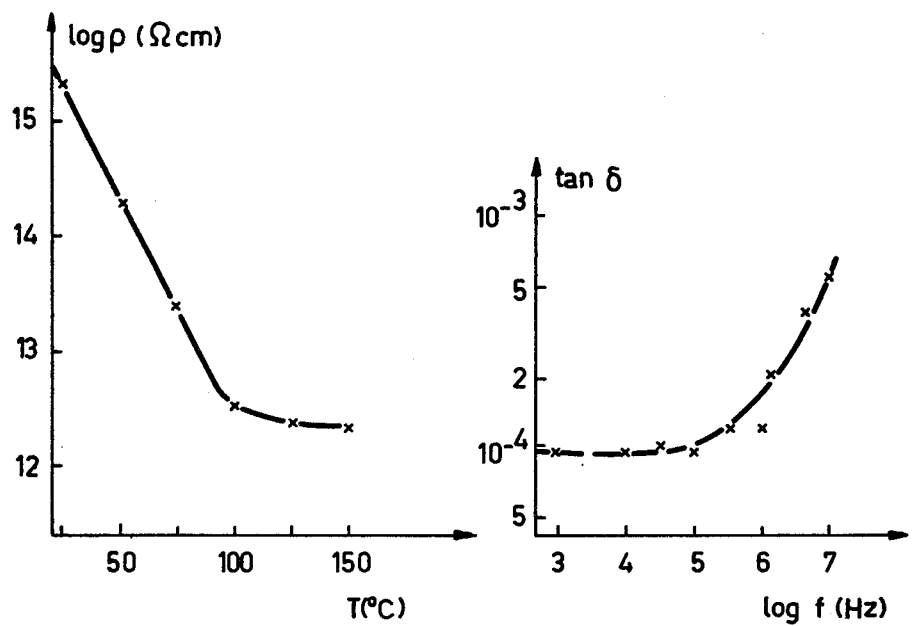

United States Patent [19]  [11] 4,260,663
Hagemann et al.  [45] Apr. 7, 1981

[54] METHOD OF PRODUCING A DIELECTRIC HAVING A PEROWSKITE STRUCTURE

[75] Inventors: Hans J. Hagemann; Siegfried Hunten, both of Aachen, Fed. Rep. of Germany

[73] Assignee: U.S. Philips Corporation, New York, N.Y.

[21] Appl. No.: 45,554

[22] Filed: Jun. 4, 1979

[30] Foreign Application Priority Data

Jun. 7, 1978 [DE] Fed. Rep. of Germany ....... 2824870

[51] Int. Cl.³ .......................... H01B 3/12; H01G 4/12; B32B 15/04; H01G 4/20
[52] U.S. Cl. .................................... 428/472; 361/313; 361/321; 427/81; 428/471; 428/472; 106/57
[58] Field of Search .................. 427/79, 81; 252/63.5, 252/63.2, 63; 428/472, 539; 361/313, 321

[56] References Cited

U.S. PATENT DOCUMENTS

| | | | |
|---|---|---|---|
| 3,153,179 | 10/1964 | Koenig et al. | 252/63.5 X |
| 3,811,937 | 5/1974 | Maher | 428/434 |
| 3,987,347 | 10/1976 | Burn | 252/63.5 X |
| 4,030,004 | 6/1977 | Rutt | 361/313 |
| 4,048,546 | 9/1977 | Bouchard et al. | 252/63.5 X |
| 4,054,531 | 10/1977 | Takahashi et al. | 252/63.5 X |
| 4,056,654 | 11/1977 | Kompanek | 428/539 X |
| 4,063,341 | 12/1977 | Bouchard | 252/63.5 X |
| 4,089,038 | 5/1978 | Bacher | 252/63.5 X |

Primary Examiner—Harold Ansher
Attorney, Agent, or Firm—Thomas A. Briody; Robert T. Mayer; Paul R. Miller

[57] ABSTRACT

Only those dielectrics which have a correspondingly low sintering temperature are suitable for the production of ceramic multi-layer capacitors having intermediate electrodes consisting of non-noble metals, such as nickel and cobalt. Suitable are ceramic masses comprising alkaline earth zirconates, wherein up to 10 mole % of the zirconium may have been replaced by titanium; iron or nickel or manganese being added as doping agents to the stoichiometrical perowskite basic compound having a composition of alkaline earth metal $(Zr_{1-x}Ti_x)O_3$ where $0 < x \leq 0.07$ and the whole assembly being sintered in a reducing atmosphere.

11 Claims, 4 Drawing Figures

METHOD OF PRODUCING A DIELECTRIC HAVING A PEROWSKITE STRUCTURE

The invention relates to a method of producing a dielectric having a perowskite structure, starting from alkaline earth zirconates, wherein up to 10 mole % of the zirconium may have been replaced by titanium.

Dielectrics of this type are important in the production of capacitors, particularly of multi-layer capacitors.

Monolithic ceramic multi-layer capacitors can combine a high degree of reliability with very high capacitances in a small volume. The ceramic starting material is processed together with a binder into thin films. A metal paste, which must form the electrodes is then applied onto such ceramic films and thereafter the films are stacked so that there is alternately a ceramic and a metal paste.

As the resultant structure of sequential layers of dielectric material and electrodes are sintered as one assembly, the material for the electrodes and the sintering conditions must be chosen so that the metal layers do not melt and do not oxidize.

It is known to produce multi-layer capacitors by means of a method wherein the ceramic material is densely sintered in air at temperatures above 1300° C. At these sintering temperatures noble metals having a high melting point, such as palladium or platinum, are suitable as the electrode material.

For a ceramic material which is used as a dielectric for capacitors, a distinction must be made between two types, with which different types of final product are obtained:

1. When a highest possible capacitance per unit of volume is the object for the capacitor to be produced (type 2 capacitor), masses comprising ferro-electric materials having a very high dielectric constant are used for the dielectric. Ferro-electric ceramic materials are understood to mean componds having a $BaTiO_3$ content of over 70 mole %.
2. For the second type, the lowest possible losses of the capacitors and a proper stability of the properties on temperature variations and field strength variations (amplitude, frequency) (type 1-capacitors) are the most important features.

The invention relates to a ceramic mass of the second type; the quality of the ferro-electric ceramic materials is not sufficient for use for multi-layer capacitors having a high stability and a high dielectric quality.

In order to enable the production of cheaper multi-layer capacitors it is known from U.S. Pat. No. 3,811,937 to use palladium-silver alloy electrodes instead of palladium electrodes for this capacitor of the second type. However, as the minimum content required for the electrode material is 30% by weight of palladium, such multi-layer capacitors are still relatively expensive components.

For completeness, it should be noted that dielectrics on the basis of alkaline earth zirconates with titanium substitution are known from the article by R. C. Kell et al, J. Am. Cer. Soc. 56 (1973) No. 7, page 53 ff., but these dielectrics must be sintered in air at temperatures of at least 1500° C. Therefore, this ceramic material cannot be used for multi-layer capacitors provided with electrodes of a non-noble material, as the sintering temperature is above the melting point of the electrode material and sintering in air causes such an electrode material to oxidize. When, on the contrary, these ceramic materials are sintered at low temperatures, the dielectric remains porous and poorer electric properties are the result; also when these materials were sintered in atmospheres having a low partial oxygen pressure a further deterioration of the electric properties was found; particularly increased dielectric losses occur at frequencies below $10^5$ Hz.

It is an object of the invention to provide a ceramic dielectric having good electric and dielectric properties, which can be sintered so that also non-noble metals such as nickel (Ni) or cobalt (Co) can be used as the material for the electrodes.

According to the invention this is accomplished by adding to the stoichiometrical perowskite starting mixture, which as a composition of $E(Zr_{1-x}Ti_x)O_3$, where $0 < x \leq 0.07$, a metal from the iron group or manganese in the form of their carbonates or oxides as the doping agent and by sintering the assembly in a reducing atmosphere to obtain a dense structure.

In accordance with a preferred embodiment of the invention, iron (Fe) or nickel (Ni) are added as metals from the iron group in a quantity of 0.2 to 1.2 mole % each, or manganese (Mn) in a quantity of 0.1 to 1.2 mole %.

Particularly advantageous capacitor properties are obtained when in accordance with preferred embodiments of the invention a perowskite-based compound, defined by the composition $CaZr_{0.985}Ti_{0.015}O_3$ is doped with 0.5 to 1.0 mole % manganese (Mn) or with 1.0 mole % iron (Fe), or when a perowskite-basic compound defined by the composition $SrZr_{0.955}Ti_{0.045}O_3$ is doped with 0.2 to 1.0 mole % manganese (Mn) or with 0.5 to 1.0 mole % iron (Fe) or with 0.5 mole % nickel (Ni).

A method in which a calcining operation is performed after mixing of the compounds which form the perowskite phase, with the compound of the metal to be added, calcining being done in the temperature range from 1100° to 1200° C., furnishes the advantage that $CO_2$ is already separated from the carbonates. So no gas is formed during the subsequent sintering process and the finished product will have a denser structure. Calcining has the additional advantage that the formation of the perowskite structure starts already in the calcining operation.

The advantages obtained with the method according to the invention consist in particular in that ceramic dielectrics can be produced which obtain their optimum ceramic electric and dielectric properties at such low sintering temperatures and in such a sintering atmosphere that also non-noble, and, consequently, cheaper, metals can be used as the material for the electrodes instead of the customary noble metals palladium and platinum. The resultant ceramic materials are single-phase and homogeneous materials.

The following Table I specifies the basic compositions of the embodiments, the abbreviations used for these formulae also being indicated.

TABLE I

| Composition | Abbreviation |
|---|---|
| $CaZr_{0.985}Ti_{0.015}O_3$ | CZT |
| $SrZr_{0.955}Ti_{0.045}O_3$ | SZT |

Figure 3:
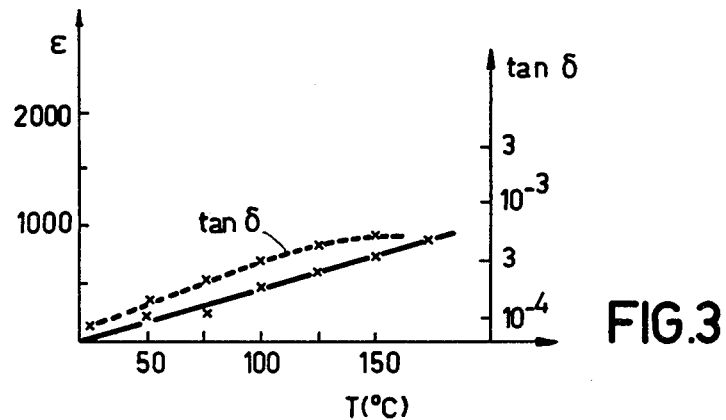
Figure 4:
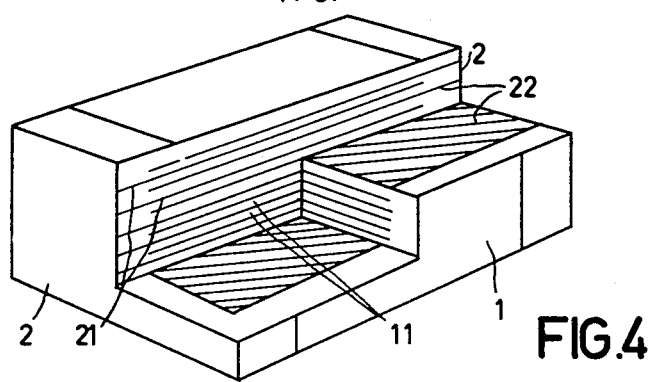

The invention will now be explained with reference to the accompanying drawing, wherein:

FIG. 1 shows the variation of the insulation resistance of SZT, doped with 0.5 mole % manganese;

FIG. 2 shows the variation of the loss angle tan δ at ambient temperature between 1 MHz and 50 MHz, measured at SZT doped with 0.5 mole % manganese;

FIG. 3 shows the variation of the dielectric constant ε and the loss angle tan δ at 10 kHz between the ambient temperature and 150° C., measured at SZT, doped with 0.5 mole % manganese, and FIG. 4 shows a perspective and partly cross-sectional view of a ceramic multi-layer capacitor.

FIG. 1 shows the variation of the insulation resistance ρ of SZT doped with 0.5 mole % manganese. The value of the insulation resistance at temperatures below 150° C. for samples sintered in mixed gas (MG; flowing mixture of moistened $N_2$ with 25% $H_2$) is >> $10^{12}$ Ohm; so capacitors having such a dielectric have a proper insulation behaviour.

FIG. 2 shows the variation of the loss angle tan δ at ambient temperature between 1 MHz and 50 MHz, measured at SLT doped with 0.5 mole % manganese. It appeared that values of less than $10^{-4}$ are obtained for the loss angle tan δ with samples sintered in a mixed gas atmosphere. The samples were sintered at 1450° C. and 1400° C.

FIG. 3 shows the variation of the dielectric constant ε and of the loss angle tan δ at 10 kHz between the ambient temperature and 150° C., measured at SZT doped with 0.5 mole % manganese.

A temperature coefficient of $TC_\epsilon = (\epsilon - \epsilon_{25})/\epsilon_{25} \times 10^6 = 8 \times 10^{-6}/°C.$ is obtained for ε. The dielectric losses of this ceramic material remain distinctly below $10^{-3}$ at temperatures up to 150° C. The samples were sintered at temperatures of 1450° C. and 1400° C.

FIG. 4 shows a perspective and partly crosssectional view of a ceramic multi-layer capacitor.

The dielectric for a multi-layer capacitor as shown in FIG. 4 is made in the form of ceramic thin films 11, having a thickness in the range from 15 to 100 μm and having a sandwich structure with electrodes 21, 22, the individual electrode layers being electrically connected by terminal contacts 2 so that one terminal contact each time alternately interconnects the electrode layers 21 and 22, respectively. For this contacting mode the electrode layers 21 and 22 are stacked so that alternately one layer extends to two facing outer areas of the sandwich structure to be formed of the ceramic films of the dielectric 1 and of the electrode layers 21, 22.

The ceramic dielectric 1 for a multi-layer capacitor as shown in FIG. 1 is of such a composition and is prepared and sintered so that, while maintaining proper electric and dielectric properties electrode materials can be used which have a lower melting point and a higher oxidizability than the noble metals palladium or platinum, which are customary for electrode layers. Nickel or cobalt, which are considerably cheaper than the noble metals palladium or platinum, can, for example, be used as the material for the electrode layers 21 and 22 in the embodiments which will now be described.

The composition of the ceramic material for the dielectric is in the range $Ca(Zr_{1-x}Ti_x)O_3$ and $Sr(Zr_{1-x}Ti_x)O_3$ x having a value up to 0.07.

Not only manganese, in the form of its carbonate $MnCO_3$, but also iron and nickel in the form of their oxides, are particularly suitable as admixtures for the perowskite starting material.

$TiO_2$, in the form of rutile, $ZrO_2$, $BaCO_3$, $SrCO_3$ and $CaCO_3$ in a very pure grade, are used as the starting materials for the perowskite basic compound. All the compounds which were used as admixtures were also very pure.

For the production of ceramic sample specimen for measuring purposes, all starting materials including the starting materials for the perowskite basic compounds as well as the starting materials for the relevant admixture, were weighed out in agreement with the desired composition and mixed, suspended in alcohol, for two hours in a planetary ball mill. The powders are dried and are thereafter presintered in air at 1200° C. for 15 hours, whereafter the powders which were calcined thus, were milled for 1 hour in a planetary ball mill and pressed mechanically and hydrostatically to rods of $7 \times 7 \times 20$ mm$^3$, having a density of 60 to 65%. The rods were sintered in a flowing mixture of moistened $N_2$ with 25% $H_2$; This gas mixture is denoted mixed gas MG hereinafter. Moistening of the gas results in a $H_2/H_2O$ ratio of 7.7, which corresponds to a partial oxygen pressure of approximately $4.10^{-12}$ bar at 1400° C. The samples are heated and cooled at a rate of approximately 3° C./min.; they are kept at the maximum temperature for a period of 15 hours.

To enable the measurement of the electric and dielectric properties, shown in the FIGS. 1 to 3, of the ceramic materials, the samples were made in the form of sintered rods which were formed into cylindrical discs having a diameter of 5 mm and being 0.15 mm thick. A 5 mm thick chromium-nickel (CrNi) layer and a 150 nm thick protective layer of gold were vacuum-deposited on the opposite faces of these discs.

The loss angle tan δ and the dielectric constant ε were determined, in dependence on the temperature and the frequency, by measuring the capacitance and the conductivity of the samples in the range from 100 Hz to 50 MHz. The dependence of ε and tan δ on the amplitude of the a.c. field between 100 V/cm and 10.000 V/cm was determined at 10 KHz at ambient temperature.

The resistivity of the ceramic materials was determined at several temperatures by measuring the leakage current 70 sec. after a constant field strength of 1 V/μm.

Samples of stoichiometrical composition and having doping material mentioned in Table II which ad been sintered to a sufficient density and with a proper microstructure were produced at a sintering temperature of 1400° C. and 1450° C., respectively, in an atmosphere of moistened $N_2$ containing 25% $H_2$.

TABLE II

| Stoichiometrical composition | Dopant |
|---|---|
| $CaZr_{0.995}Ti_{0.005}O_3$ | 1 Mol.% Mn |
| $CaZr_{0.985}Ti_{0.015}O_3$ | 0.5–1.0 Mol.% Mn |
| $CaZr_{0.985}Ti_{0.015}O_3$ | 1.0 Mol.% Fe |
| $CaZr_{0.97}Ti_{0.03}O_3$ | 0.5–1.0 Mol.% Mn |
| $SrZr_{0.98}Ti_{0.02}O_3$ | 0.5–1.0 Mol.% Mn |
| $SrZr_{0.955}Ti_{0.045}O_3$ | 0.2–1.0 Mol.% Mn |
| $SrZr_{0.955}Ti_{0.045}O_3$ | 0.5–1.0 Mol.% Fe |
| $SrZr_{0.955}Ti_{0.045}O_3$ | 0.5 Mol.% Ni |
| $SrZr_{0.93}Ti_{0.07}O_3$ | 0.2–1.0 Mol.% Mn |

The below Table III states the sintering conditions as well as the dielectric and electric properties of the samples produced in the above-described manner.

TABLE III

| Composition | | Sintering temp. $T_S$(°C.) | Dielectric constant $\epsilon$ 25° C. (10KHz) | Average temp. coeff. of $\epsilon$ TC(ppm/°C.) | Loss factor tan$\epsilon$ 25° C. (10KHz) $\times 10^{-4}$ | Insulation resistance $\rho$25° C. ($\Omega$cm) |
|---|---|---|---|---|---|---|
| $CaZr_{0.995}Ti_{0.005}O_3$ | + 1.0mol.% $MnCO_3$ | 1450 | 31,4 | +54 | 9 | $3 \times 10^{13}$ |
| $CaZr_{0.985}Ti_{0.015}O_3$ | + 0.5mol.% $MnCO_3$ | 1450 | 30,7 | +23 | 11 | $2 \times 10^{12}$ |
| | + 1.0mol.% $MnCO_3$ | 1400 | 31,2 | +16 | 21 | $7,5 \times 10^{12}$ |
| | + 0.5mol.% $Fe_2O_3$ | 1450 | 29,5 | +20 | 14 | $9 \times 10^{11}$ |
| $CaZr_{0.97}Ti_{0.03}O_3$ | + 0.5mol.% $MnCO_3$ | 1450 | 30 | −52 | 13 | $1,2 \times 10^{12}$ |
| | + 1.0mol.% $MnCO_3$ | 1400 | 29,5 | −60 | 18 | $2,3 \times 10^{12}$ |
| $SrZr_{0.98}Ti_{0.02}O_3$ | + 0.5mol.% $MnCO_3$ | 1450 | 34,4 | +84 | 2,3 | $6 \times 10^{14}$ |
| | + 1.0mol.% $MnCO_3$ | 1400 | 36,6 | +77 | 3,5 | $4,5 \times 10^{14}$ |
| $SrZr_{0.955}Ti_{0.045}O_3$ | + 0.2mol.% $MnCO_3$ | 1450 | 35 | +8 | 4,6 | $3,5 \times 10^{13}$ |
| | + 0.5mol.% $MnCO_3$ | 1400 | 35,8 | +6 | <1 | $1,8 \times 10^{15}$ |
| | + 1.0mol.% $MnCO_3$ | 1350 | 37,2 | −2 | 2,7 | $9 \times 10^{14}$ |
| | + 0.25mol.% $Fe_2O_3$ | 1450 | 31,4 | +7 | 1 | $2 \times 10^{14}$ |
| | + 0.5mol.% $Fe_2O_3$ | 1400 | 36 | +18 | 8,5 | $6,5 \times 10^{13}$ |
| + 0.5mol.% NiO | 1450 | 28,7 | (+2) | 1,7 | $7 \times 10^{14}$ | |
| $SrZr_{0.93}Ti_{0.07}O_3$ | + 0.2mol.% $MnCO_3$ | 1450 | 35,1 | −82 | 3,5 | $4 \times ^{13}$ |
| | + 0.5mol.% $MnCO_3$ | 1400 | 35,0 | −81 | 2,0 | $7,5 \times 10^{15}$ |
| | + 1.0mol.% $MnCO_3$ | 1350 | 35,8 | −86 | 3,0 | $6,5 \times 10^{14}$ |

In Table III $T_S$ represents the minimum sintering temperature at which the ceramic material had a density of at least 95% and TC the mean temperature coefficient of $\epsilon$ between 25° C. and 125° C. The value placed between brackets in the column TC indicates that in this case the temperature varied in a highly non-linear manner.

A dielectric of the stoichiometrical basic composition $SrZr_{0.955}Ti_{0.045}O_3$, doped with 0.5 mole % manganese appeared to be a very advantageous dielectric for the production of multi-layer capacitors. A density of over 95% was obtained at sintering temperatures of 1400° C. and 1450° C. FIGS. 1, 2 and 3 show the insulation resistance as a function of the temperature, the temperature dependence of $\epsilon$ and tan $\delta$ and the dependence on the frequency of tan $\delta$ for a dielectric of this type. An investigation into the dependence of the dielectric constant $\epsilon$ and of the loss factor tan $\delta$ on the amplitude of the a.c. field did not show a measurable change in $\epsilon$ and tan $\delta$ for this ceramic material up to at least 10 kV/cm. The results of life tests to determine the values of the insulation resistance and the density for a ceramic material of this type are shown in the following Tables IV and V.

TABLE IV

Insulation resistance in $\Omega$cm at ambient temperature after the application of a load of $2 \times 10^4$ V/cm for SZT + 0.5 mole % Mn

| Load at | initial value | after 100 h | after 500 h | after 1000 h |
|---|---|---|---|---|
| 125° C. | $1.8 \times 10^{15}$ | $1.9 \times 10^{15}$ | $2.0 \times 10^{15}$ | $2.1 \times 10^{15}$ |
| 200° C. | $1.8 \times 10^{15}$ | $2.0 \times 10^{15}$ | $2.05 \times 10^{15}$ | $2.1 \times 10^{15}$ |

Table V shows the density in a percentage of the theoretical density for a ceramic material of the above-mentioned type at two different sintering temperatures and in different sintering atmospheres.

TABLE V

Density in a percentage of the theoretical density for SZT + 0.05 mole % Mn

| theoretical density ($g/cm^3$) | sintering in air | | sintering in mixed gas | |
|---|---|---|---|---|
| | 1450° C. | 1400° C. | 1450° C. | 1400° C. |
| 5.45 | 99.1 | 97.4 | 99.3 | 96.7 |

The following procedure was adopted to produce a multilayer capacitor having a dielectric of the stoichiometrical composition $SrZr_{0.955}Ti_{0.045}O_3$ and doped with 0.5 mole % manganese. A pulverent ceramic primary mix, having a composition $SrZr_{0.955}Ti_{0.045}O_3$ + 0.5 mole % $MnO_2$ and presintered at 1200° C. was made first. This powder was suspended in 30% by weight of deionized water by means of a wetting agent. The suspension was intimately mixed together with an organic binder, for example polymerized hydro-carbons, and a plasticizer in a dispersion mill.

This plasticizer may be, for example triethylene glycol. The suspension thus obtained was outgassed at a reduced pressure and stirred together with a wetting agent. A thin layer of this suspension was drawn from an overflow container by means of a rotating steel belt and dried to approximately 40 $\mu$m thick ceramic films. As large a number of non-fired ceramic film portions as required for the desired capacitor thickness are then stacked. Electrode layers, approximately 9 $\mu$m thick, were provided between these films, these layers consisting of nickel powder having a grain size of approximately 0.2 to 0.8 $\mu$m, and an organic binder, for example cellulose acetate. Thereafter, the stack was pressed and made into monolithic multi-layer blocks by means of punching. The blocks were heated at a rate of 0.5° C./min. in an $N_2/O_2$-atmosphere in a ratio by volume of 5:1 to 100:1 to 600° C. in order to evaporate the solvents and combust the binder. Thereafter, the blocks were heated in a reducing atmosphere at a rate of 3° C./min. to 1400° C. and sintered at this temperature for 10 hours. The reducing atmosphere consisted of $N_2$ and $H_2$ in a ratio by volume of 1:4 and had a $H_2O$-content which was adjusted by moistening the gas mixture at 25° C. After sintering the blocks were cooled to room temperature at a rate of 3° C./min. the atmosphere not being changed. The sintered monolithic blocks were provided with properly adhering and solderable electric terminal contacts by baking a mixture of nickel and glass powder in the above-described atmosphere. The electric properties of three different specimen of these multi-layer capacitors are shown in the following table VI:

TABLE VI

| Number of the capacitor | 1 | 2 | 3 |
|---|---|---|---|
| Length (mm) | 2,0 | 4,5 | 5,7 |
| Width (mm) | 1,25 | 2,0 | 5,0 |
| Thickness (mm) | 0,6 | 0,6 | 0,8 |
| Number of layers | 2 | 10 | 30 |
| Capacitance | 10,7 pF | 381 pF | 9,3 nF |
| Average temp. coefficient of between 25° C. and 125° C. | +5 | +3 | −4 |
| Loss angle (tan ε) | $1,6 \times 10^{-4}$ | $3,2 \times 10^{-4}$ | $8 \times 10^{-4}$ |
| Insulation resistance (Ω) | $4,5 \times 10^{14}$ | $1,2 \times 10^{13}$ | $2,8 \times 10^{11}$ |
| Capacitance × Insulation resistance | 4800 | 4600 | 2600 |

The capacitance and the loss angle δ were measured at a frequency f = 10 kHz and an a.c. field amplitude E = 20 kV/cm.

Known procedures, other than the described drawing procedure, such as printing, spraying or doctor-blading can, alternatively, be used to produce the film portions. Other reducing gas mixtures, such as $CO/CO_2$, $Ar/H_2$ etc. may, alternatively, be used instead of the above-mentioned reducing atmosphere, consisting of moistened $N_2/H_2$-mixtures.

Instead of nickel powder, other non-noble metals such as iron, cobalt or alloys of two or three metals can, alternatively, be used for the electrode layers.

What is claimed is:

1. A method of producing a dielectric having a perowskite structure, starting from alkaline earth zirconates, wherein up to 10 mole % of the zirconium may have been replaced by titanium, characterized in that a metal of the iron group or manganese were added in the form of their carbonates or oxides as doping agent to the stoichiometrical perowskite basic compound having a composition of $E(Zr_{1-x}Ti_x)O_3$, where $0 < x \leq 0.07$, and that the whole assembly is sintered in a reducing atmosphere to obtain a dense structure.

2. A method as claimed in claim 1, characterized in that iron (Fe) or nickel (Ni) are used as the metals from the iron group as the admixture in a quantity of 0.2 to 1.2 mole %.

3. A method as claimed in claim 1, characterized in that manganese (Mn) is added in a quantity of 0.1 to 1.2 mole %.

4. A method as claimed in claim 3, characterized in that a perowskite basic compound of the composition $CaZr_{0.985}Ti_{0.015}O_3$ is doped with 0.2 to 1.2, preferably 0.5 to 1.0 mole % of manganese.

5. A method as claimed in claim 2, characterized in that a perowskite basic compound having the composition $CaZr_{0.985}Ti_{0.015}O_3$ is doped with 0.5 to 1.2, preferably 1.0, mole % of iron.

6. A method as claimed in claim 3, characterized in that a perowskite basic compound having the composition $SrZr_{0.955}Ti_{0.045}O_3$ is doped with 0.1 to 1.2 mole %, preferably 0.2 to 1.0 mole %, of manganese.

7. A method as claimed in claim 2, characterized in that a perowskite basic compound having the composition $SrZr_{0.955}Ti_{0.045}O_3$ is doped with 0.2 to 1.2 mole %, preferably 0.5 to 1.0 mole %, of iron.

8. A method as claimed in claim 2, characterized in that a perowskite basic compound having the composition $SrZr_{0.955}Ti_{0.045}O_3$ is doped with 0.2 to 1.0 mole %, preferably 0.5 mole %, of nickel.

9. A method as claimed in claim 1, characterized in that after mixing the compounds which form the perowskite phase with the compound of the metal to be added a calcining procedure is performed in the temperature range from 1100° to 1200° C., whereafter the product is milled, shaped and thereafter sintered at a temperature in the range from 1320° to 1450° C. in a reducing atmosphere.

10. A method as claimed in any one of claims 1 to 9, characterized in that the preform to be sintered is provided prior to the sintering process with at least two layers of electrode-forming nickel (Ni) or cobalt (Co).

11. A multi-layer capacitor having a dielectric produced by means of the method claimed in any one of claims 1 to 10 and provided with nickel (Ni) or cobalt (Co) electrodes.

* * * * *